United States Patent [19]
Nonaka

[11] Patent Number: 6,101,336
[45] Date of Patent: Aug. 8, 2000

[54] CAMERA WITH SELF-TIMER PHOTOGRAPHING FUNCTION

[75] Inventor: Osamu Nonaka, Sagamihara, Japan

[73] Assignee: Olympus Optical Co., Ltd, Tokyo, Japan

[21] Appl. No.: 09/061,981

[22] Filed: Apr. 17, 1998

[30] Foreign Application Priority Data

Apr. 18, 1997 [JP] Japan ..................................... 9-101975

[51] Int. Cl.⁷ .................................................. G03B 17/24
[52] U.S. Cl. ............................................. 396/121; 396/264
[58] Field of Search .............................. 396/264, 89, 95, 396/121, 123

[56] References Cited

U.S. PATENT DOCUMENTS 5,640,224   6/1997   Omi et al. ............................... 396/264

FOREIGN PATENT DOCUMENTS

| | | |
|---|---|---|
| 56-36632 | 4/1981 | Japan . |
| 56-36633 | 4/1981 | Japan . |
| 60-147709 | 8/1985 | Japan . |
| 07064181 | 3/1995 | Japan . |

*Primary Examiner*—David M. Gray
*Attorney, Agent, or Firm*—Louis Weinstein

[57] ABSTRACT

A camera with self-timer photographing function has a release button for a release switch operation, a self-timer photographing mode switching button, and the like. A photographing mode for a scene in which only a photographer enters a screen and a photographing mode for a scene in which a plurality of persons are an object to be photographed are switched by the mode switching button in photographing in a self-timer photographing mode. Photographing is executed by an AF (AUTOMATIC FOCUSING) operation performed a self-timer time after in the former mode, photographing is executed by an AF operation performed immediately after a release switch operation in the later ode. According to this camera, in the self-timer photographing, photographing with a correct focus for the state of an object can be always performed without checking the focus in photographing or checking a distance measurement target in a finder.

16 Claims, 9 Drawing Sheets

CAMERA WITH SELF-TIMER PHOTOGRAPHING FUNCTION

BACKGROUND OF THE INVENTION

1. Field of the Invention

The present invention relates to a camera with a self-timer photographing function in which photographing is performed a predetermined time after a photographing start operation is detected.

2. Related Art Statement

A conventional camera with a self-timer photographing function has a disadvantage that a desired portion is out-of-focus. However, as a device for solving this problem, for example, a camera which limits an AF process (Automatic Focusing process) in self-timer photographing is proposed in Japanese Examined Patent Publication No. 62-18901 (Japanese Unexamined Patent Publication No. 56-36632). A camera which inhibits an AF process in self-timer photographing is proposed in Japanese Examined Patent Publication No. 62-18902 (Japanese Unexamined Patent Publication No. 56-36633). Japanese Unexamined Patent Publication No. 60-147709 is related to a camera in which portions subjected to distance measurement are increased in number in self-timer photographing, and out-of-focus can be prevented without viewing from a finder.

However, as in the above conventional camera with self-timer photographing function, when the AF process function added to the camera is limited or inhibited, even if an object to be photographed is located at a position where correct distance measurement can be performed, an accurate focusing operation cannot be achieved disadvantageously. In addition, when distance measurement points are recklessly increased in number without viewing from a finder, a probability of an object to be photographed which is targeted at an operator before a release operation is out-of-focus increases.

SUMMARY OF THE INVENTION

The present invention has been made in consideration of the above problem, and has as its object to provide a camera with self-timer photographing function in which, in self-timer photographing, photographing having a correct focus with respect to the state of an object to be photographed can be always performed without checking the focus in the photographing or checking a distance measurement target in a finder.

According to the present invention, a camera with self-timer photographing function in which photographing is performed a predetermined time after a photographing start operation is detected, comprises: distance measurement means for outputting a distance measurement signal depending on a distance of an object to be photographed; lens drive means for driving the focus of a photographing lens on the basis of the distance measurement signal from the distance measurement means; switching signal output means for outputting a switching signal representing whether the state of the object is a first object state or a second object state in self-timer photographing; and control means for making a distance measurement of the distance measurement means in photographing performed a predetermined time after valid when the first object state is determined as a result of detection of the switching signal, and making distance measurement of the distance measurement means immediately after the photographing start operation valid when the second object state is determined.

The above as well as other characteristic features and advantages of the present invention will be sufficiently apparent upon consideration of the following description.

DETAILED DESCRIPTION OF THE PREFERRED EMBODIMENTS

Embodiments of the present invention will be described below with reference to the accompanying drawings.

Prior to a detailed description of cameras with a self-timer photographing function according to embodiments of the present invention, the outline of a self-timer photographing operation performed by the camera will be described below. In photographing in a self-timer photographing mode, if an object to be photographed is one person in photographing, it may be determined that a photographer herself/himself is the object. If an object to be photographed is a plurality of persons in photographing, it may be determined that a photographer checks the focus with a finder in advance or that the photographer checks the object in the distance measurement frame. Therefore, in the former scene in a first object state in which an object to be photographed is one person, the object enters a screen after a release operation is performed. For this reason, if distance measurement is not performed immediately before photographing is performed a self-timer set time after, a focusing operation cannot be performed. In the later scene in a second object state in which an object to be photographed is a plurality of persons, it is considered that distance measurement for a focusing operation has been correctly performed when a release operation is performed, and a photographing operation may be performed such that priority is given to a distance measurement result obtained immediately after the release operation.

In the camera with self-timer photographing function according to the present invention, before photographing, it is checked by a photographer herself/himself or automatically checked whether an object to be photographed is one person or a plurality of persons. In this manner, distance measurement is performed immediately before photographing as described above or performed immediately after a release operation to execute photographing.

Figure 1B:
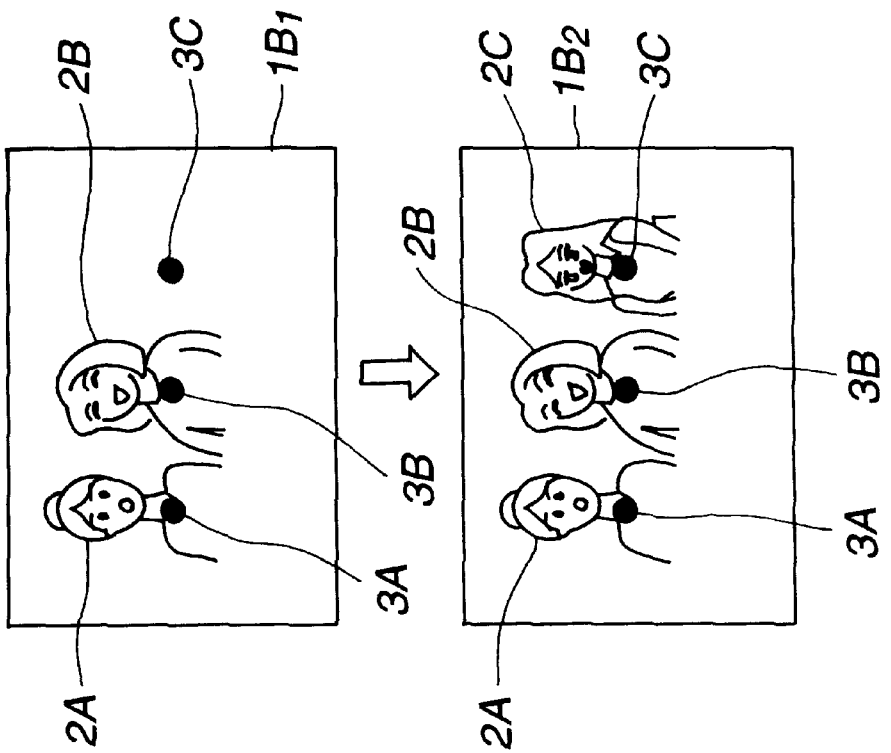
FIG. 1B, like FIG. 1A, is a view useful for explaining the outline of the camera with self-timer photographing function, and is a view showing photographing scenes immediately after a release operation and a self-timer time after when an object state is an assembly object.
Figure 1A:
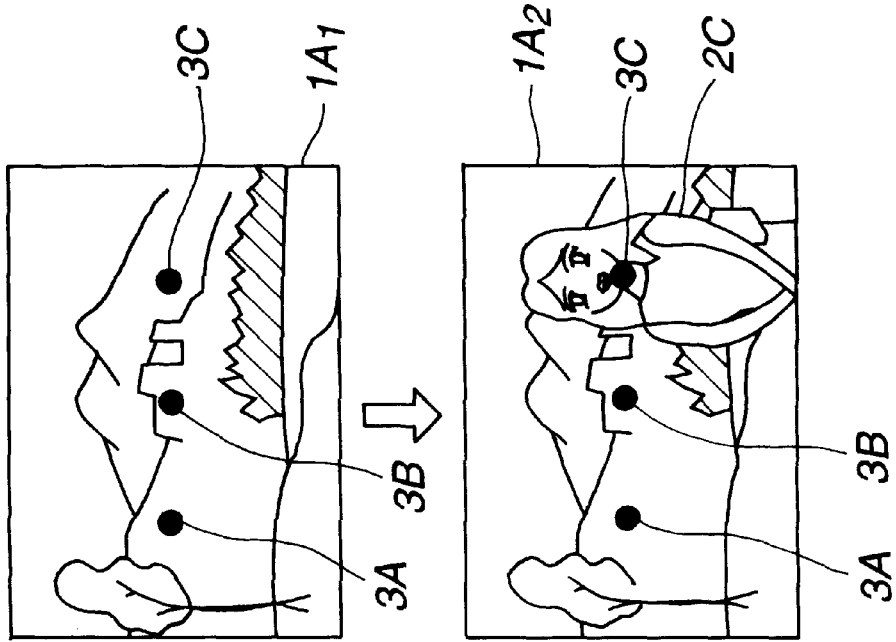
FIG. 1A is a view useful for explaining the outline of a camera with self-timer photographing function according to the present invention, and is a view showing photographing scenes immediately after a release operation and a self-timer time after when an object state is a one-person object.

FIGS. 1A and 1B are views showing the difference between the screens in the release operation and the photographing operation in the two scenes in the self-timer photographing. FIG. 1A shows a first object state and a situation in which a photographer photographs herself/himself in traveling alone or the like. In the release operation, only a background enters in a screen 1A1. However, in photographing performed a self-timer set time (to be referred to as self-timer time after hereinafter) after, an object to be photographed 2C which is the photographer herself/himself enters the screen as a main object to be photographed as shown in a screen 1A2, and, in this picture, the photographer wants to focus the camera on the object 2c, which is the photographer, rather than the background. On the other hand, FIG. 1B shows a second object state and a situation of a picture taken when some persons meet each other for a memorial picture or the like. More specifically, two objects to be photographed 2A and 2B have entered a screen 1B1 in a release operation, and a photographer enters a screen 1B2 a self-timer time after as an object to be photographed 2C.

In the case in FIG. 1A, the focusing operation immediately after the release operation is not significant, and distance measurement and a focusing operation performed immediately before photographing with respect to the object 2C, which is a person, are important. When a photographer gives priority to a situation checked with a finder, the distance measurement performed immediately after the release operation is desired as described above. However, in photographing the scene as shown in FIG. 1A, when the object 2C serving as a target enters the screen after the release operation, even if the photographer tries to focus the camera on the object 2C, this focusing operation cannot be performed by the distance measurement performed immediately after the release operation.

In the situation as shown in FIG. 1B, in a release operation, the objects to be photographed 2A and 2B have entered the screen, and distance measurement and a focusing operation may be performed with respect to the objects 2A and 2B. Therefore, even if the object 2C, which is the photographer, enters the screen after the release operation, the focus need not be changed. In this situation, if a focusing operation is performed on the basis of a result of distance measurement performed immediately before photographing performed the self-timer time after, even if the photographer performs correct framing with respect to an object to be photographed, a third party crosses the screen until the photographing is performed, the photographer herself/himself enters a distance measurement point 3. Furthermore, when the object to be photographed is different from the object 2A or 2B which is to be originally focused, a picture having a photographing failure may be obtained. Therefore, as in the scene in FIG. 1B, when the photographer gives priority to a situation checked by the photographer with the finder, distance measurement immediately after the release operation is desirable.

The camera with self-timer photographing function according to the present invention has the following arrangement. That is, whether a scene to be photographed is the scene shown in FIG. 1A or the scene shown in FIG. 1B is determined by a photographer or is automatically determined by the camera, and a switching signal corresponding to the determination is output, so that distance measurement suitable for each scene or the timing of a focusing operation is selected.

Cameras with self-timer photographing function according to respective embodiments of the present invention will be described below.

Figure 2:
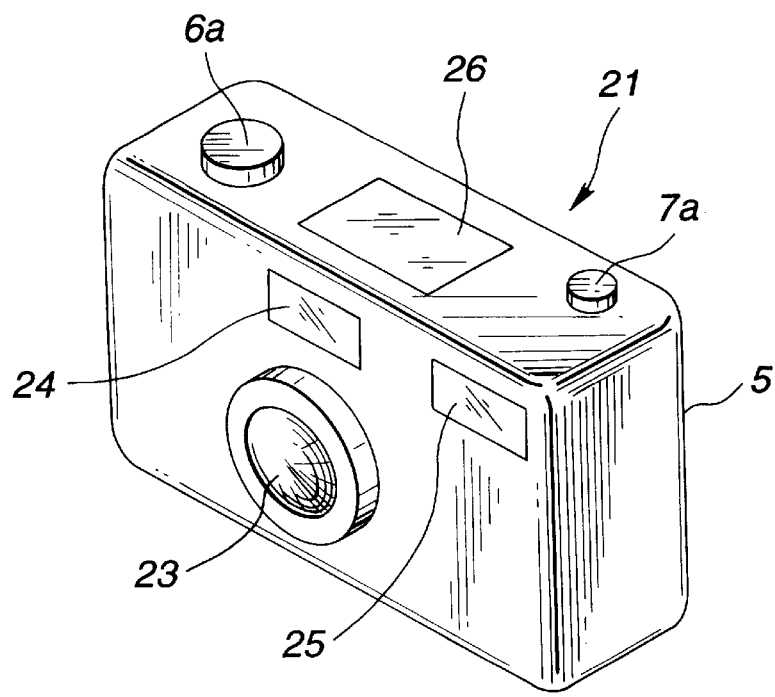
FIG. 2 is a perspective view showing the appearance a camera with self-timer photographing function according to a first embodiment of the present invention.

FIG. 2 is a perspective view showing the appearance of a camera with self-timer photographing function 21 showing the first embodiment of the present invention. On a camera body 5 of the camera 21, a photographing lens 23, a finder objective lens 24, a release button 6a for operating a release switch 6 (see FIG. 3), an electric flash window 25, a display LCD 26, and a mode switching button 7a for performing a switching operation of a self-timer photographing mode switch 7 (see FIG. 3).

Figure 3:
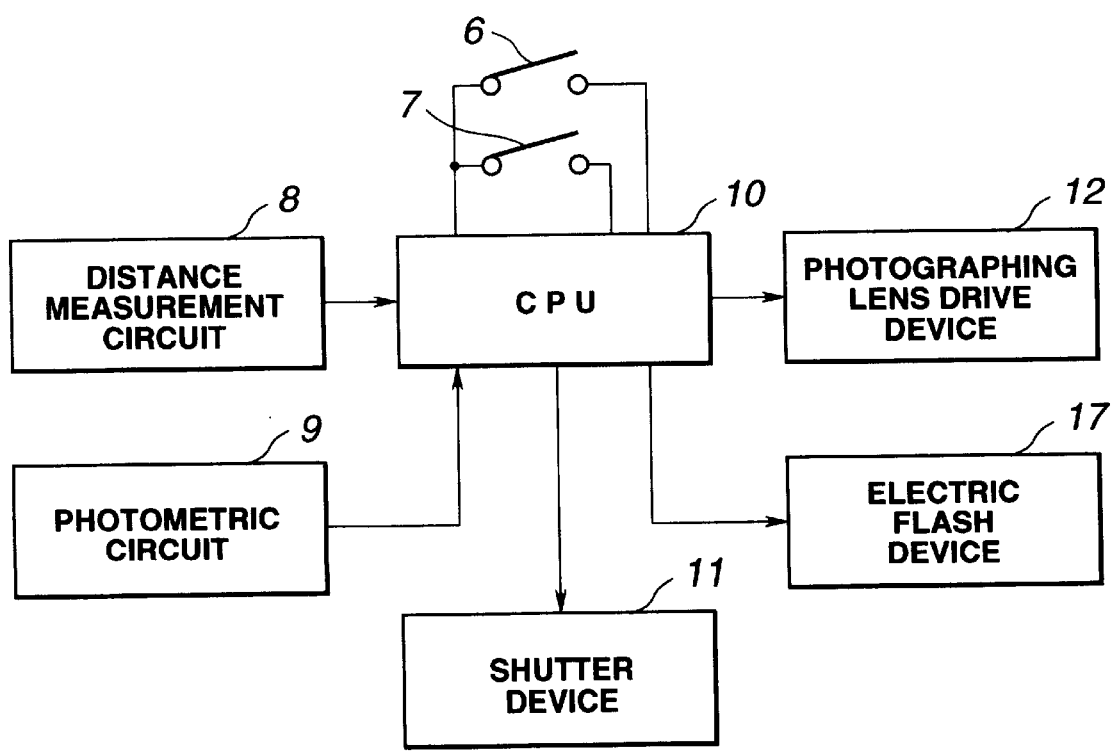
FIG. 3 is a main block diagram showing the camera with self-timer photographing function in FIG. 2.

FIG. 3 is a main block diagram showing the camera with self-timer photographing function 21 described above. The camera 21 comprises: a CPU 10 which serves as a control means mainly constituted by a one-chip microcomputer or the like, controls units, and controls the sequence of all operations of the camera; the release switch 6 and the self-timer photographing mode switch 7 which are operated by the release button 6a or the mode switching button 7a and whose operation outputs are received by the CPU 10; a distance measurement circuit 8 serving as a distance measurement means which can perform multi-point distance measurement; a photographing lens drive device 12, including a drive motor or the like, for reciprocating the photographing lens 23 to perform a focusing operation; a photometric circuit 9 serving as an exposure photometric means; a shutter device 11 for performing exposure control for an object image; and an electric flash device 17 which flashes to compensate for light when exposure is not quickly performed by only spontaneous radiation of light.

Figure 4:
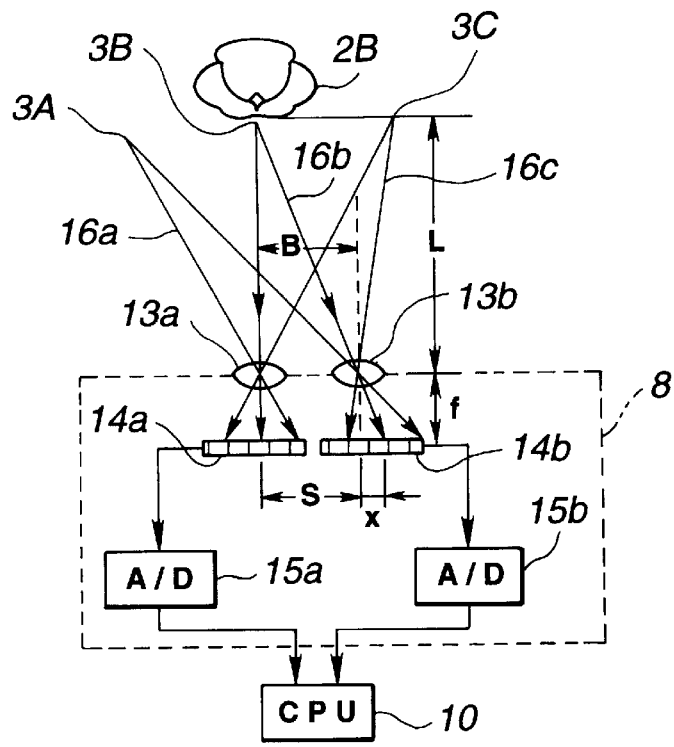
FIG. 4 is a view showing the detailed circuit arrangement of a distance measurement circuit and a CPU in the camera with self-timer photographing function in FIG. 2.

FIG. 4 is a circuit diagram showing the detailed circuit arrangement of the distance measurement circuit 8 and the CPU 10. The distance measurement circuit 8 has a disparity B like both the eyes of a human being, two left and right light-receiving lenses 13a and 13b having a focal distance f, two left and right sensor arrays 14a and 14b, arranged near the focal distance f of both the light-receiving lenses, for converting the image of the object 2B or the like into an electric signal, and A/D conversion circuits 15a and 15b for converting the image signal converted into the electric signal into a digital signal.

The sensor arrays 14a and 14b convert object images received by the light-receiving lenses 13a and 13b into electric signals. The image signals converted into the electric signals are converted into digital signals by the A/D conversion circuits 15a and 15b to be output to the CPU 10.

The CPU 10 detects an offset based on the disparity B is detected by using one pair of digital image signals obtained as described above, and calculates an object distance L by using the following equation on the basis of the offset X. That is, the object distance L is calculated by:

$$L = B \cdot f / X \qquad (1).$$

As distance measurement points for calculating the object distance, as shown in FIGS. 1A and 1B, three distance measurement points 3A, 3B, and 3C in a screen are used. For example, as shown in FIG. 4, in distance measurement of the distance measurement point 3B of a screen central object 2B, an optical path 16b is used to compare the position of an image signal near the optical axis of the light-receiving lens 13a in the sensor array 14a with the position of a corresponding image signal on the sensor array 14b. In distance measurement of the distance measurement point 3A on the left within the screen, an optical path 16a is used to compare a right image of the sensor array 14a with a right image of the sensor array 14b in the same manner as described above, thereby calculating an object distance. In distance measurement of the distance measurement point 3C on the right within the screen, an optical path 16c is used to compare a left image of the sensor array 14a with a left image of the sensor array 14b in the same manner as described above, thereby calculating an object distance.

For example, if the object 2C is not necessarily located at the center of the screen in the scene as shown in FIG. 1A, distance measurement of the object 2C and an accurate focusing operation can be performed.

The self-timer photographing mode switch 7 is a switch for switching two types of modes in a self-timer photographing mode. One of the two types of modes is a one-person object photographing mode. In this mode, after a release button operation, an AF operation is performed immediately before photographing performed a self-timer time after, i.e., distance measurement of the distance measurement points 3A, 3B, and 3C is performed immediately before photographing, and the focus of the photographing lens is driven by the distance measurement data, so that photographing is performed. In addition, the other is an assembly object photographing mode. In this mode, the AF operation is performed immediately after the release button operation, and a photographing operation is performed a self-timer time after.

A self-timer photographing operation performed by the camera with self-timer photographing function 21 according to this embodiment with the above arrangement will be described below.

As in the self-timer photographing operations in both the scenes in FIGS. 1A and 1B, photographing exposure is started a predetermined time after a release operation. However, in fact, the above scenes are completely different from each other in situation. Therefore, prior to the photographing of one of the scenes, a photographer operates the mode switching button 7a to switch the self-timer photographing mode switch 7 according to the corresponding photographing scene. More specifically, when a photographing scene is a one-person object scene corresponding to the first object state in FIG. 1A, the mode is switched to the one-person object photographing mode. When a photographing scene is an assembly scene for a plurality of objects corresponding to the second object state in FIG. 1B, the mode is switched to the assembly object photographing mode.

Thereafter, the release button 6a is operated to execute self-timer photographing. However, when the one-person object photographing mode is selected, after the release button 6a is operated, an AF operation is performed immediately before photographing performed a predetermined time after, i.e., distance measurement is performed immediately before photographing. After the lens is driven on the basis of the distance measurement data, photographing is executed. When the assembly object photographing mode is selected, an AF operation is performed immediately after the release button 6a is operated, and a photographing operation is executed while keeping the state.

In the camera 21, the timing of distance measurement for an AF operation in photographing is controlled by the CPU 10 in accordance with the self-timer photographing mode selected in self-timer photographing.

Figure 5:
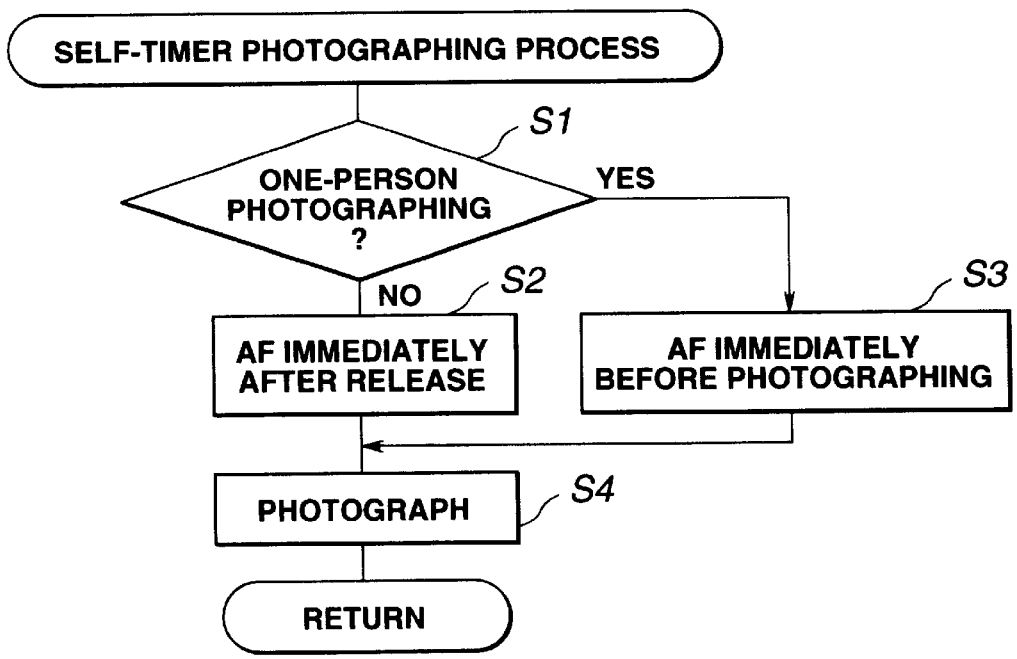
FIG. 5 is a flow chart of a self-timer photographing process of the camera with self-timer photographing function in FIG. 2.

FIG. 5 is a flow chart of the outline of a self-timer photographing process in the camera with self-timer photographing function 21 according to this embodiment. In step S1, the switching state of the self-timer photographing mode switch 7 is checked. More specifically, when a photographer instructs the camera that a photographing scene corresponds to a one-person object photographing state, the control branches off to step S3, an AF operation is performed immediately before photographing, and photographing is performed in step S4. When the photographer instructs the camera to perform one-person object photographing, i.e., when the photographer instructs the camera to photograph an assembly object, the control branches off to step S2, an AF operation is performed immediately after the release button 6a is operated, and photographing is executed in step S4.

As described above, according to the camera with self-timer photographing function 21 of this embodiment, in self-timer photographing, the timing of an AF operation performed when a photographer will photograph herself/himself is made different from the timing of an AF operation performed when a photographer will photograph herself/himself together with other objects as in an assembly picture. For this reason, a camera which can perform self-timer photographing with an accurate focus based on her/his intention can be provided.

A camera with self-timer photographing function 31 according to the second embodiment of the present invention will be described below. The arrangement of the camera according to this embodiment is the same as the arrangement in FIG. 3 except for only the following points. That is, the self-timer photographing mode switch 7 is not necessary, and a self-timer photographing process of the CPU 10 serving as a control means for performing control is performed in a manner different from that in the arrangement in FIG. 3.

Figure 6A:
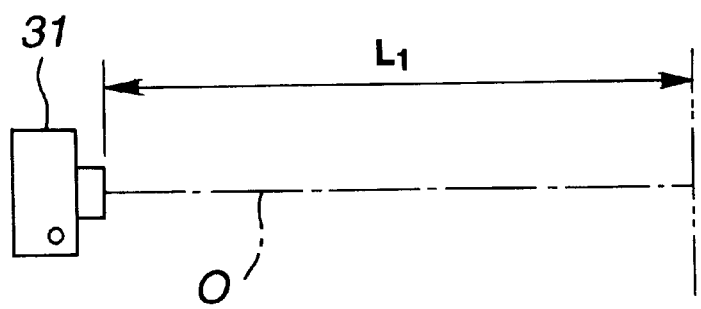
FIG. 6A is a view showing a camera with self-timer photographing function according to a second embodiment of the present invention and the state of an object to be photographed in a self-timer photographing operation using the camera with self-timer photographing function, and is a view showing a state immediately after a release operation.

FIG. 6A is a view showing the camera 31 in self-timer photographing and the state of an object to be photographed, and shows a situation in a release button operation. An object 2 is not in view of the camera 31. In this situation, the first distance measurement is performed. Thereafter, as in a view showing the state of an object in FIG. 6B, assume that a photographer moves within a self-timer time, and that the photographer stands as the object 2 in view of the camera 31. In this state, when the second distance measurement is performed, the result of the first distance measurement is different from the result of the second distance measurement.

A technique in which photographing is performed a self-timer time after on the basis of the difference between the result of the first distance measurement and the result of the second distance measurement has been conventionally proposed. However, a conventional camera cannot actually determine whether the result of the first distance measurement is employed or the result of the second distance measurement is employed.

In self-timer photographing of a one-person object state in which only a photographer is an object to be photographed in the scene shown in FIG. 1A, when the photographer enters the screen immediately before photographing, the result of the second distance measurement must be employed. In self-timer photographing of an assembly object state in which a plurality of persons are an object to be photographed in the scene shown in FIG. 1B, when the photographer wants to focus the camera on an object other than the photographer who enters the screen later, the result of the first distance measurement must be employed.

Figure 6B:
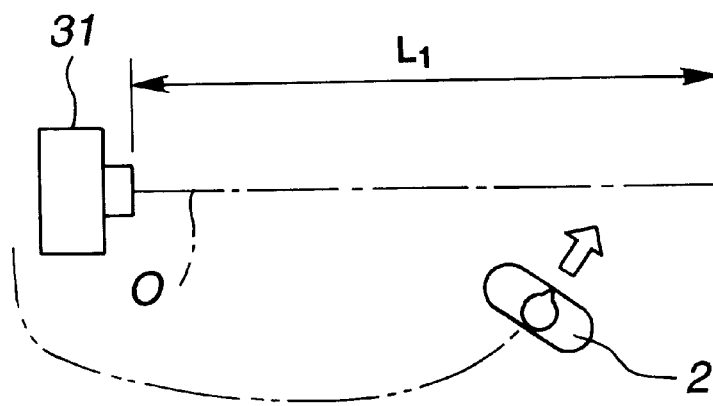
FIG. 6B, like FIG. 6A, is a view showing the camera and the state of the object to be photographed, and is a view showing a state a self-timer time after the state immediately after the release operation in FIG. 6A.

In the camera with self-timer photographing function 31 according to this embodiment, these scenes are specified by checking whether the result of the first distance measurement is longer than a predetermined distance L1 shown in FIG. 6B. More specifically, the result of the first distance measurement in the scene in FIG. 1A is a very long distance, but the result of the first distance measurement in the scene in FIG. 1B is a relatively short distance. For this reason, the predetermined distance L1 is set to be about 5 m or about 50 times the focal distance of the photographing lens to check whether the result of the first distance measurement is longer than the predetermined distance L1, thereby causing the CPU 10 to specify these scenes.

Figure 7:
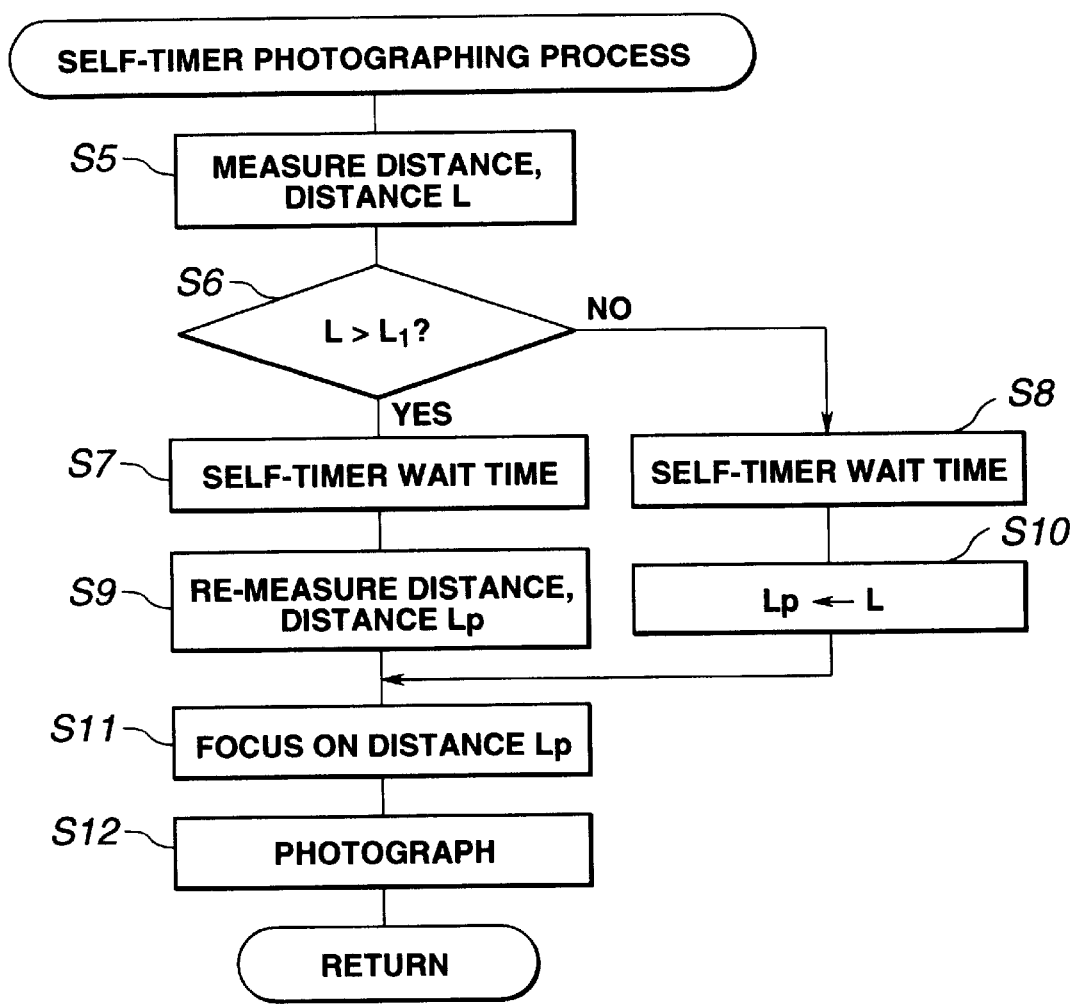
FIG. 7 is a flow chart of a photographing process of the camera with self-timer photographing function in FIG. 6A.

FIG. 7 is a flow chart of a self-timer photographing process in the camera 31 according to this embodiment. In this self-timer photographing process, distance measurement is performed immediately after a release operation in step S5 to receive the result of the first distance measurement as a distance measurement value L. The object distance L and the predetermined distance L1 are compared with each other in step S6. If it is determined that the object distance L is larger than the predetermined distance L1, a photographing scene is considered as the scene in FIG. 1A, the one-person object photographing mode is set, and the control branches off to step S7. The CPU waits for a self-timer time in step S7, re-measurement of the distance is performed in step S9, and the resultant value of the distance measurement is set as the object distance $L_P$. A focusing operation on the object distance is performed in step S11, and photographing is perform ed in step S12, so that this routine is completed.

If it is determined in the determination in step S6 that the distance measurement distance L is not longer than the predetermined distance L1, the assembly object photographing mode is set, and the control branches off to step S8. Therefore, the distance measurement distance L of the first distance measurement is set to be the object distance $L_P$, and the flow shifts to step S11 and the subsequent steps. In this state, a focusing operation is performed, and photographing is executed, so that this routine is completed.

As described above, according to the camera with self-timer photographing function 31 of this embodiment, the camera is controlled such that the timing of an AF operation for focusing is determined by comparing the result of the first distance measurement with the predetermined distance L1. For this reason, a correct focusing operation can be performed in self-timer photographing for an assembly picture or in self-timer photographing for only one person. In addition, when the control branches off to step S8 in the determination in step S6, re-measurement of the distance is not performed. For this reason, excessive power is not consumed, and a power consumption can be saved.

A camera with self-timer photographing function 41 according to the third embodiment of the present invention will be described below with reference to FIG. 8. The arrangement of the camera 41 according to this embodiment is the same as the arrangement in FIG. 3 except for only the following points. That is, the self-timer photographing mode switch 7 is not necessary, and a self-timer photographing process of the CPU 10 serving as a control means for performing control is performed in a manner different from that in the arrangement in FIG. 3.

The camera 41 according to this embodiment is a camera which more positively uses a result of multi-point (multi) distance measurement described in FIG. 4. More specifically, in this camera, on the basis of the result of distance measurement of left and right distance measurement points of three distance measurement points, it is determined whether a scene to be photographed is the one-person object photographing scene in FIG. 1A or the assembly object photographing scene in FIG. 1B, and an AF operation is executed by the determination result.

Figure 8:
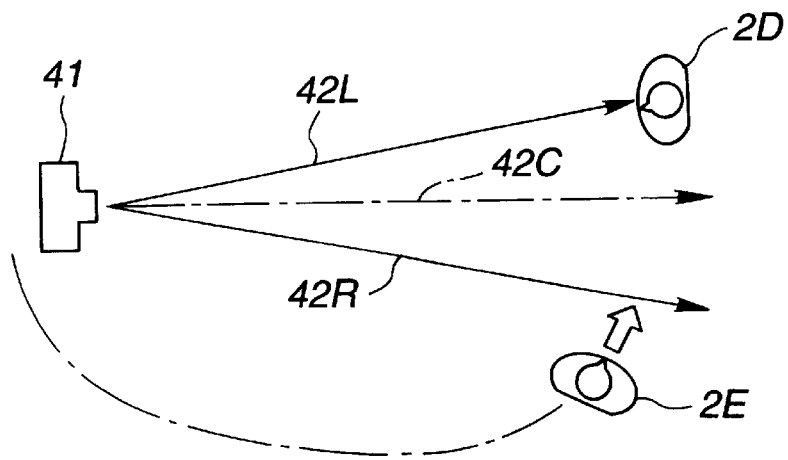
FIG. 8 is a view showing a camera with self-timer photographing function according to a third embodiment of the present invention and the state of an object to be photographed in a self-timer photographing operation using the camera with self-timer photographing function.

FIG. 8 is a view showing a manner in which a photographer is adjacent to an object 2D, which has been framed, as an object 2E after a release operation. The distance measurement results of distance measurement points in three directions 42L, 42C, and 42R immediately after the release operation in this state are as follows. That is, the distance measurement point in the left direction 42L has the distance of the object 2D, i.e., a short distance, and the distance measurement point in the right direction 42R has a long distance because no object exists at the distance measurement point in the direction 42R. In the camera 41, for example, the state of a photographing scene is determined on the basis of the magnitude of the difference between the distance measurement values of the distance measurement points in the two directions 42L and 42R.

More specifically, upon completion of the release operation, a photographer enters the distance measurement point in the right direction 42R as the object 2E immediately before photographing, and photographing is executed. However, when the difference between the distance measurement values obtained at the left and right points by the multi distance measurement immediately after the release operation is larger than a predetermined value, it is determined that the scene is a photographing scene for an assembly object. When the difference is smaller than the predetermined value, it is determined that the scene is a photographing scene for a one-person object. In this manner, self-timer photographing for the respective scenes is executed.

Figure 9:
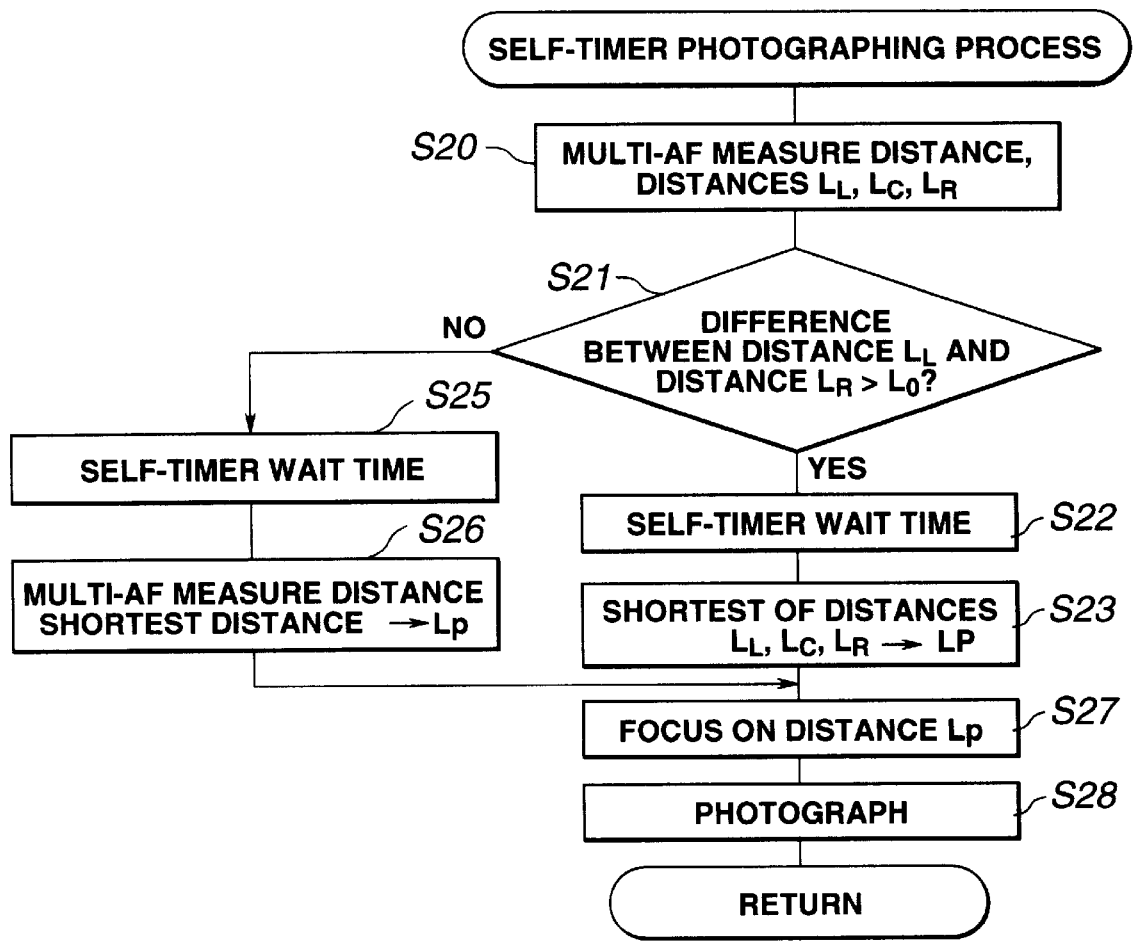
FIG. 9 is a flow chart of a photographing process of the camera with self-timer photographing function in FIG. 8.

FIG. 9 is a flow chart of a self-timer photographing process of the camera with self-timer photographing function 41 according to this embodiment. After a release operation in self-timer photographing, multi-point distance measurement (multi-AF) of the three points is performed in step S20 to measure distances $L_L$, $L_C$, and $L_R$ in the directions 42L, 42C, and 42R. In step S21, the distances $L_L$ and $L_R$ of the left and right distance measurement results are compared with each other. When the distance different is larger than a predetermined distance difference $L_O$, the scene is regarded as an assembly photographing scene, the assembly object photographing mode is set, and the control branches off to step S22.

The CPU waits for a self-timer time in step S22, the flow shifts to step S23. Here, it is assumed that the object 2D has been framed, the shortest one of the distances $L_L$, $L_C$, and $L_R$ obtained by the multi-point distance measurement performed immediately after a release operation in step S20 is employed as an object distance $L_P$ to be focused, and the flow shifts to step S27. The photographing lens is driven to a focus position for the object distance $L_P$ in step S27, and photographing is executed in step S28, so that this routine is completed.

When it is determined in the determination process in step S21 that the distance difference between the distances $L_L$ and $L_R$ is smaller than the predetermined distance difference $L_O$, it is considered that no other person than the photographer is to be photographed, the one-person object photographing mode is set, and the control branches off to step S25. Therefore, the CPU waits for the self-timer time, the multi distance measurement is performed again in step S26, the shortest distance of the distances $L_L$, $L_C$, and $L_R$ is employed as the object distance $L_P$ to be focused. The flow shifts to step S27 to perform a focusing operation on the object distance $L_P$, and photographing is executed in step S28, so that this routine is completed.

As described above, according to the camera with self-timer photographing function 41 according to this embodiment, since the result of the multi-AF is effectively used to determine whether a scene to be photographed is a scene in which only a photographer enters the screen or a scene of an assembly object, a picture whose focus depends on the intention of the photographer can be taken.

A camera with self-timer photographing function 51 according to the fourth embodiment of the present invention will be described below. The arrangement of the camera 51 according to this embodiment is the same as the arrangement in FIG. 3 except for only the following points. That is, the self-timer photographing mode switch 7 is not necessary, and a self-timer photographing process of the CPU 10 serving as a control means for performing control is performed in a manner different from that in the arrangement in FIG. 3.

Figure 10:
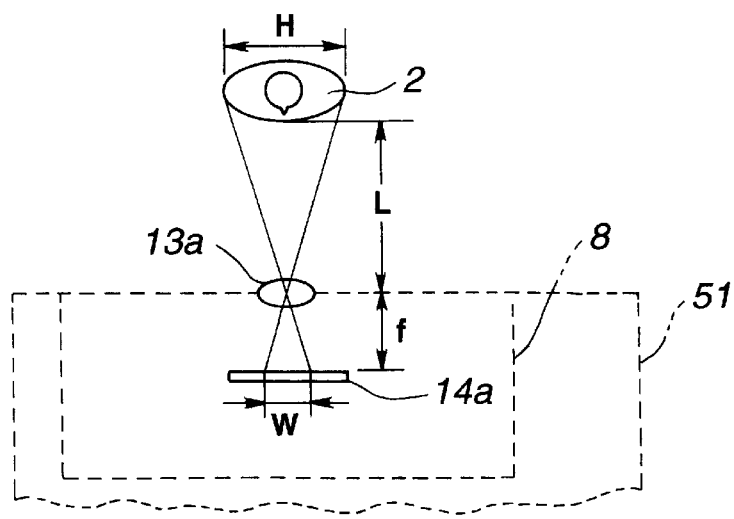
FIG. 10 is a view showing a part of a distance measurement circuit in a camera with self-timer photographing function according to a fourth embodiment of the present invention.

FIG. 10 is a view showing only the left-side light-receiving portion of the distance measurement circuit 8 in the camera 51 according to this embodiment and the object 2. As described in FIG. 4, the image of the object 2 is received through the light-receiving lens 13a, and the image is formed on the sensor array 14a for distance measurement. Assume that the light-receiving lens 13a has a focal distance f and that the object 2 has a width H. In this case, if the object distance L is set, the width W of an object image formed on the sensor array 14a is given by:

$$W = f \cdot H/L \quad (2)$$

As described in FIG. 4, a relative offset between the object images is detected on the basis of one pair of sensor outputs of the left and right sensor arrays 14a and 14b, and the object distance L can be calculated according to the principle of triangular distance measurement.

The shoulder length H of a human being serving as an object falls within a predetermined range. Therefore, on the basis of the dimension of an image width W on the sensor array 14a, it can be determined whether an object is a person or not, and the number of persons serving as the object can be determined.

An embodied method of determining the number of persons to be photographed using detection of an image width on the sensor array of the camera 51 according to this embodiment will be described below.

Figure 11A:
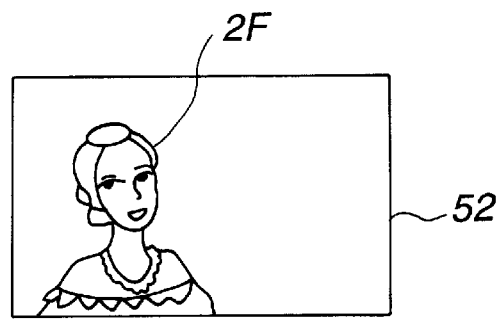
FIG. 11A is a view showing a screen of a one-person object state immediately after a release operation in a self-timer photographing operation of the camera with self-timer photographing function in FIG. 10.
Figure 11B:
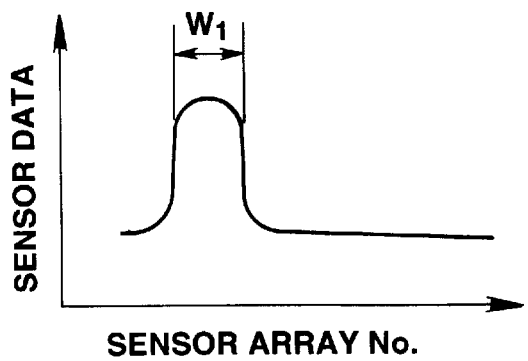
FIG. 11B is a graph showing a sensor data output waveform in the screen state in FIG. 11A.
Figure 12A:
FIG. 12A is a view showing a state a self-timer time after in a self-timer photographing operation of the camera with self-timer photographing function in FIG. 10, and is a view showing a screen obtained when an object enters the screen the time after.
Figure 12B:
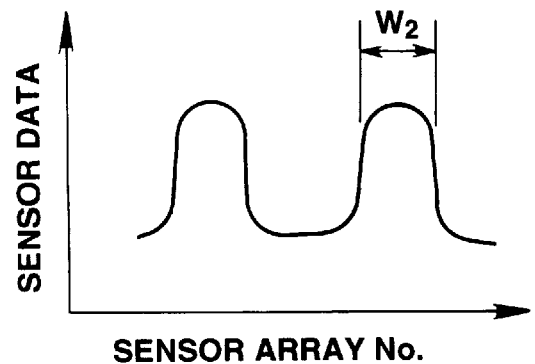
FIG. 12B is a graph showing a sensor data output waveform in the screen state in FIG. 12A.

FIG. 11A shows a screen 52 for a one-person object immediately after a release operation, and FIG. 11B is a view showing a sensor data output waveform of the sensor array 14a in FIG. 4. FIG. 12A shows a screen 53 showing a state in which another object, i.e., another person is added a self-timer time after, and FIG. 12B is a graph showing a sensor data output waveform of the sensor array 14a in FIG. 4.

In the screen 52 immediately after the release operation in FIG. 11A, as shown in the waveform in FIG. 11B, an image width W1 of an object 2F on the sensor array is obtained. In particular, when the difference between the luminance of a background and the luminance of a person is large, the sensor data waveform more sharply changes. As shown in FIG. 12A, if a photographer is added as an object 2G the self-timer time after, as shown in the waveform in FIG. 12B, the image width W1 of the object 2F in FIG. 11B and an image width W2 of the object 2G are obtained on the sensor array.

In the camera 51 according to this embodiment, in self-timer photographing, the state of an object, i.e., a one-person object or an assembly object, is determined by checking whether the object of the image width W2 corresponding to a photographer is detected on the screen the self-timer time after.

Figure 13:
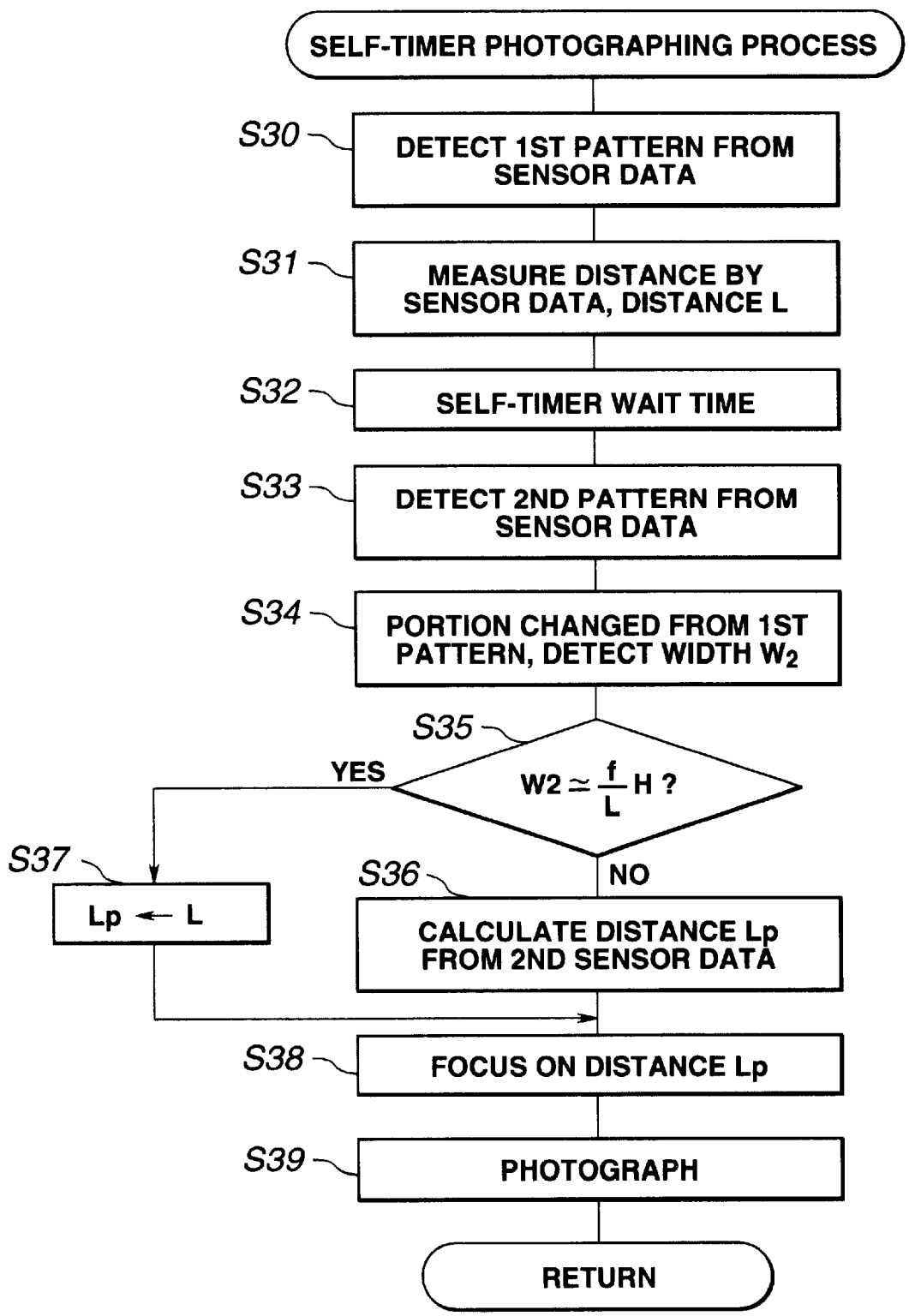
FIG. 13 is a flow chart of a photographing process of the camera with self-timer photographing function in FIG. 10.

FIG. 13 shows a flow chart of a self-timer photographing process in the camera 51 according to this embodiment.

In this process routine, sensor data detection is performed immediately after a release button operation in step S30, a sensor data as shown in FIG. 11B is received by the CPU 10. As described with reference to FIG. 4 in step 31, a relative offset is detected from one pair of sensor data of the left and right sensor arrays 14a and 14b, the object distance L is calculated on the basis of the principle of triangular distance measurement.

After the self-timer time in step S32, a pattern obtained by the second sensor data is received from the sensor arrays 14a and 14b again. At this time, when the photographer enters the screen as the object 2G as shown in FIG. 12B, the sensor data changes into data set in the state in FIG. 12B. In step S34, if there is a changed portion, the image width W2 is detected.

In step S35, a value $f \cdot H/L$ representing an image width corresponding to the shoulder width H is calculated by using the object distance L calculated in step S31, the focal distance f of the AF light-receiving lens 13a, and the shoulder width H of an average person, and the value $f \cdot H/L$ is compared with the image width W2. If the image width W2 is almost equal to the value $f \cdot H/L$ as a comparison result, the CPU 10 determines a situation of an assembly object in which a plurality of objects arranged as shown in FIG. 12A are to be photographed, the control branches off to step S37, and the object distance L which is the result of the first distance measurement obtained in step S31 is employed as the object distance $L_P$ for focusing. Focusing on the object distance $L_P$ is performed in step S38, and photographing is executed in step S39, so that this routine is completed.

On the other hand, when the image width W2 is different from the value f·H/L, it is determined that photographing for an assembly picture is not performed, the object distance L obtained by the second sensor data obtained in step S35 is employed as the object distance $L_P$ for focusing. Focusing on the object distance $L_P$ is performed in step S38, and photographing is similarly executed in step S39, so that this routine is completed.

As described above, according to the camera with self-timer photographing function 51 of the fourth embodiment, a change in sensor data of the AF sensor array 14a is detected, and the shoulder width of a person is determined, so that it can be correctly determined whether the object is a person. In addition, by using a changed portion of the sensor data on the screen, distance measurement is performed in step S34 or step S36. For this reason, the second distance measurement performed the self-timer time after becomes more reliable, and correct self-timer photographing which is free from out-of-focus can be performed.

A camera obtained by modifying the camera with self-timer photographing function according to the fourth embodiment will be described below.

The camera with self-timer photographing function according to this modification, in its self-timer photographing process, detects an image width W1 by the first sensor data detected in step S30 in FIG. 13. The camera has the following characteristic feature. That is, the dimension of the image width W1 is checked to determine whether the photographing is for a one-person object or an assembly object.

Figure 14:
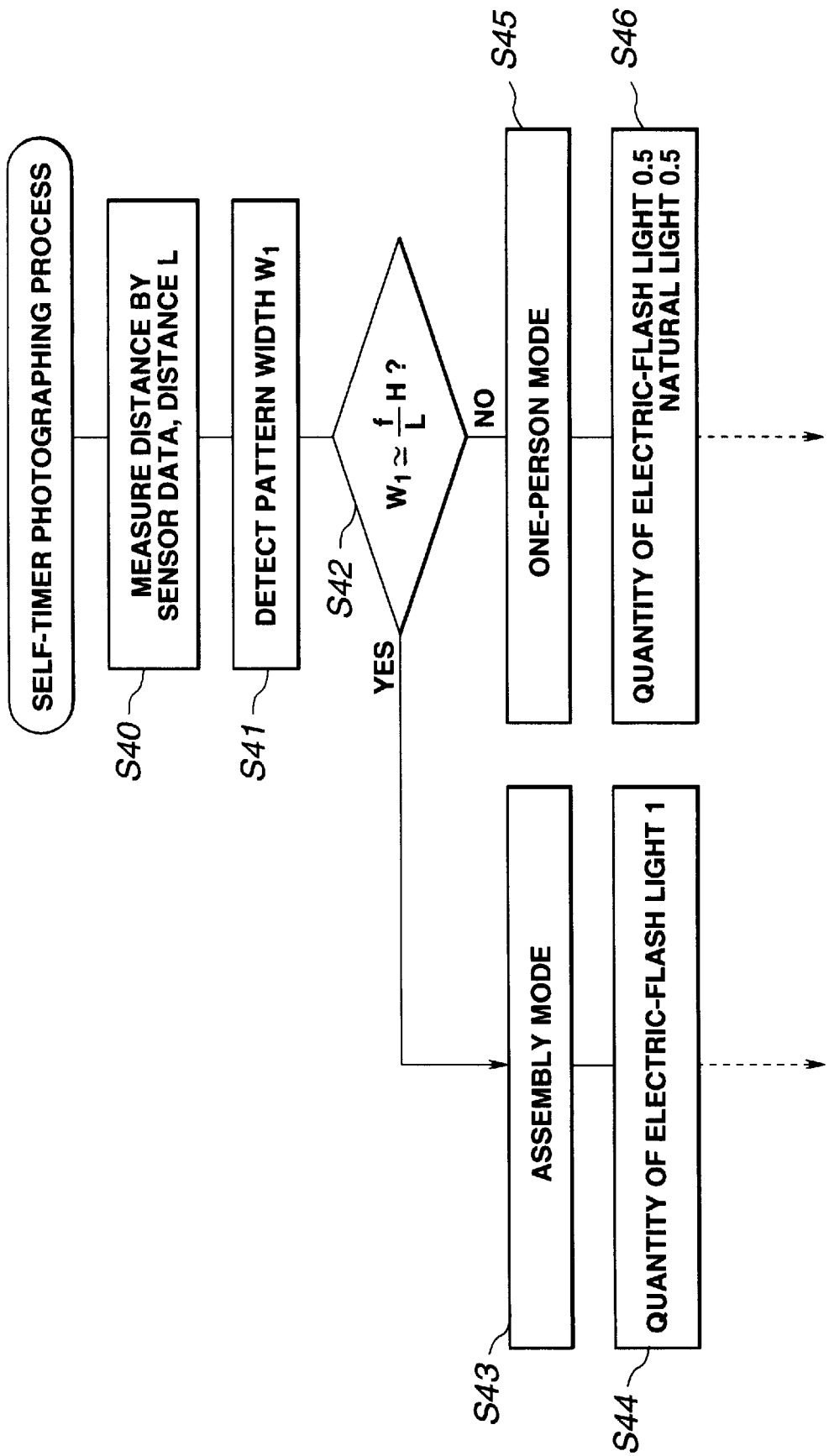
FIG. 14 is a flow chart of a self-timer photographing process in a camera obtained by modifying the camera with self-timer photographing function according to the fourth embodiment in FIG. 10.

FIG. 14 is a flow chart of a self-timer photographing process in the camera of this modification. In this routine, the first distance measurement is made immediately after a release operation in step S40. In step S41, the image width W1 shown in FIG. 11B is detected by using the sensor data of the sensor array 14a of the portion subjected to distance measurement. In step S42, whether the image width W1 corresponds to the shoulder width H of an average person is checked to determine whether an object subjected to distance measurement is a person. The determination is performed by checking whether the image width W1 is almost equal to the value f·H/L.

When it is determined in the determination in step S42 that the image width W1 is a value corresponding to a person, it is determined that the person has been in the screen, and the photographing scene is regarded as the photographing scene shown in FIG. 1B. The control branches off to step S43, and a self-timer photographing mode for photographing an assembly object is set. In this case, as an object distance for focusing, the distance obtained as the result of the first distance measurement in step S40 is employed.

When it is determined in the determination in step S42 that the image width W1 is not a value corresponding to a person, a thing other than a person is in the screen, and the photographing scene is regarded as the photographing scene shown in FIG. 1A. The control branches off to step S45, and a self-timer photographing mode for photographing a one-person object is set. In this case, an object distance for focusing, the distance obtained as the result of the second distance measurement performed a self-timer time after is employed.

After the self-timer mode is set in step S43 or S45, the flow shifts to step S44 or S46. However, in step S44 or S46, when an object is dark, electric-flash light is changed in distribution depending on the one-person object photographing mode and the assembly object photographing mode, so that photographing more suitable for the situation is designed to be performed.

More specifically, since persons to be photographed are more important than a background in the assembly object photographing mode, a quantity of electric-flash light is set to be 1 such that exposure is performed by only electric-flash light in consideration of blurring of the object. However, since a background is important in the one-person object photographing mode, exposure control in which a ratio of natural light to electric-flash light is set to be 0.5:0.5 is performed such that the background is printed with as correct exposure as possible.

Since a camera is fixed by a tripod or the like in self-timer photographing, even if a shutter speed is relatively low, the picture is not easily blurred. When electric-flash light is not necessary, the processes in steps S44 and S46 are not necessary. For a simple description, a branch used when the electric-flash process is not necessary and the processes subsequent to the step of setting a quantity of electric-flash light are not shown in the flow chart in FIG. 14.

As described above, in the camera with self-timer photographing function according to the modification, the width of an object is determined on the basis of an output from the sensor array 14a for distance measurement, and it is considered whether the object is a person to determine whether self-timer photographing to be performed is for an assembly object or a one-person object. In addition, since not only a focusing operation but also a way of exposure control can be appropriately switched with respect to the situation, a camera in which self-timer photographing which is more suitable for the purpose of a photographer with a simple arrangement can be provided.

The camera according to each of the embodiments is a camera with self-timer photographing function. In the camera, self-timer photographing is executed a relatively short time after a release switch is operated as a photographing start operation. However, the spirit and scope of the present invention can also be applied to a camera having an interval photographing function in which photographing is executed a relatively long time after a photographing start operation. In this case, a situation using distance measurement data immediately after the photographing start operation and a situation using distance measurement data a predetermined time after can be selectively used.

What is claimed is:

1. A camera with a self-timer photographing function for performing photographing a predetermined time after a photographing start operation is detected, comprising:

distance measurement means which can output a distance measurement signal depending on a distance of an object to be photographed immediately after the photographing start operation and immediately before photographing is performed the predetermined time after a photographing start operation is detected;

lens drive means for adjusting a focus of a photographing lens based on the distance measurement signal of said distance measurement means;

switching signal output means for outputting a switching signal representing whether a state of the object is a first object state or a second object state in self-timer photographing; and control means for initiating a distance measurement of said distance measurement means in photographing performed a predetermined time after a photographing start operation when the first object state is determined as a result of detection of the switching signal, and initiating a distance measurement of said distance measurement means immediately after a photographing start operation when the second object state is determined, whereby to control said lens drive means in self-timer photographing.

2. A camera with a self-timer photographing function according to claim 1, comprising determination means for determining an object state by checking whether a distance of the object is longer than a predetermined distance as the result of said distance measurement means immediately after the photographing start operation, wherein a switching signal is output from said switching signal output means based on a determination result of said determination means.

3. A camera with a self-timer photographing function according to claim 1, wherein said distance measurement means, which performs distance measurement at a plurality of points in a photographing region screen, further comprises determination means for comparing distance measurement results at the plurality of points to determine an object state, and a switching signal from said switching signal output means based on a determination result of said determination means.

4. A camera with a self-timer photographing function according to claim 1, wherein said distance measurement means, which has a plurality of sensor arrays for detecting an image pattern of the object, further comprises: determination means for determining an object state by the image pattern, and a switching signal is output from said switching signal output means based on a determination result of said determination means.

5. A camera with a self-timer photographing function for starting a photographing operation a predetermined time after a photographing start operation, comprising:

distance measurement means for measuring a distance of an object immediately after the photographing start operation and/or immediately before photographing performed said predetermined time after;

lens drive means for adjusting a focus of a photographing lens based on a distance measurement result of said distance measurement means; and switching signal generation means for outputting a switching signal depending on an object state in which the object is only one person, i.e., a photographer herself/himself, or a plurality of persons to camera control means in self-timer photographing, wherein, when the focus of said photographing lens is adjusted by said lens drive means, it is determined based on the switching signal whether a distance measurement result to be used is a distance measurement result obtained immediately after the photographing start operation or a distance measurement result immediately before photographing performed said predetermined time after.

6. A camera with self-timer photographing function according to claim 5, comprising determination means for determining that the object is a photographer herself/himself when a result of said distance measurement means immediately after the photographing start operation is longer than a predetermined distance.

7. A camera with a self-timer photographing function according to claim 5, wherein said distance measurement means, which is constituted to be able to perform distance measurement at a plurality of points in a photographing region screen, further comprises determination means for determining that the object is a plurality of persons when a difference between distance measurement results at the plurality of points obtained when the distance measurement results at the plurality of points are compared with each other is larger than a predetermined value.

8. A camera with self-timer photographing function according to claim 5, wherein said distance measurement means, having a sensor array, comprises determination means for determining whether the object is one person or a plurality of persons in photographing by checking an output pattern of the sensor array.

9. A camera with a self-timer photographing function according to claim 5, wherein said switching signal output means has an operation switch which can be selectively operated by a photographer depending on an object state as to whether the object is only one person who is the photographer himself or a plurality of persons.

10. A camera with a self-timer photographing function according to claim 5, wherein said switching signal output means automatically outputs a switching signal depending on said object state based on a determination performed by the distance measurement result of said distance measurement means immediately after the photographing start operation.

11. A camera with a self-timer photographing function comprising:

self-timer photographing setting means for setting a self-timer photographing mode in which photographing is performed a predetermined time after a photographing start operation is detected;

distance measurement means for, when the self-timer photographing mode is set, making it possible to output a first distance measurement signal depending on an object state immediately after the photographing start operation and a second distance measurement signal depending on an object state in photographing performed said predetermined time after;

lens drive means for adjusting a focus of a photographing lens based on a distance measurement signal of said distance measurement means;

switching means for switching object states such that an object state is set to be a first object state or a second object state depending on the object state desired; and control means for, in the self-timer photographing, controlling said lens drive means by the first distance measurement signal of said distance measurement means immediately after the photographing start operation when said switching means sets the second object state, or by the second distance measurement signal of said distance measurement means in photographing performed said predetermined time after when said switching means sets the first object state.

12. A camera with a self-timer photographing function comprising:

self-timer photographing setting means for setting a self-timer photographing mode in which photographing is performed a predetermined time after a photographing start operation is detected;

distance measurement means for, when the self-timer photographing mode is set, making it possible to output a first distance measurement signal depending on an object state immediately after the photographing start operation and a second distance measurement signal depending on an object state in photographing performed said predetermined time after;

lens drive means for adjusting a focus of a photographing lens based on a distance measurement signal of said distance measurement means;

determination means for determining whether an object state is a first object state or a second object state based on the first distance measurement signal obtained by said distance measurement means; and control means for controlling said lens drive means by the first distance measurement signal of said distance measurement means immediately after the photographing start operation when the second object state is determined as a determination result obtained by said determination means or controlling said lens drive means by the second distance measurement signal of said distance measurement means in photographing performed said predetermined time after when the first object state is determined.

13. A camera with a self-timer photographing function for performing photographing a predetermined time after a photographing start operation is detected, comprising:

a distance measurement circuit for outputting a distance measurement signal depending on a distance of an object by receiving a distance measurement start signal; and self-timer photographing mode switching means for, in the self-timer photographing, making it possible to switch a mode to a first mode in which the distance measurement start signal immediately before photographing performed said predetermined time after the photographing start operation is used for photographing and a second mode in which the distance measurement start signal immediately after the photographing start operation is used for photographing.

14. A camera with a self-timer photographing function for performing photographing a predetermined time after a photographing start operation is detected, comprising:

a distance measurement circuit having first distance measurement means for outputting distance measurement data depending on an object state immediately after a photographing start operation and second distance measurement means for detecting the photographing start operation to make it possible to output distance measurement data depending on an object state a predetermined time after;

a lens drive device for adjusting a focus of a photographing lens based on a distance measurement result of said first or second distance measurement means; and a determination circuit for determining an object state by comparing the distance measurement data obtained by said first distance measurement means with the distance measurement data obtained by said second distance measurement means.

15. A camera with self-timer photographing function according to claim 14, wherein said distance measurement circuit has a sensor array which can output distance measurement data falling within a predetermined range of an object, and said distance measurement circuit determines an object state by using a changed portion of the distance measurement data on a sensor array obtained by said second distance measurement means with respect to the distance measurement data of said first distance measurement means.

16. A camera with a self-timer photographing function according to claim 14, comprising:

control means for making a distance measurement of said distance measurement means in photographing performed said predetermined time after a photographing start operation when the first object state is determined as the determination result obtained by said determination circuit, and making a distance measurement of said distance measurement means immediately after the photographing start operation when the second object state is determined, said lens drive device being driven and controlled the predetermined time after valid based on the valid distance measurement result.

* * * * *

UNITED STATES PATENT AND TRADEMARK OFFICE
CERTIFICATE OF CORRECTION

PATENT NO. : 6,101,336
DATED : August 8, 2000
INVENTOR(S) : Osamu Nonaka

It is certified that error appears in the above-identified patent and that said Letters Patent is hereby corrected as shown below:

Column 4,
Line 25, after the word "point", delete "3" and insert therefor --3c--.

Column 5,
Line 23, before the word "is", insert therefor --, which--.

Signed and Sealed this

Twelfth Day of June, 2001

*Attest:*

*Attesting Officer*

NICHOLAS P. GODICI
*Acting Director of the United States Patent and Trademark Office*